United States Patent [19]
Stella et al.

[11] 3,848,938
[45] Nov. 19, 1974

[54] BEARING AND BEARING SEAL

[75] Inventors: Leo Stella, Bristol, Conn.; Alfred J. Sarbello, Agawam, Mass.

[73] Assignee: The Torrington Company, Torrington, Conn.

[22] Filed: Feb. 28, 1973

[21] Appl. No.: 336,542

[52] U.S. Cl. ............................ 308/36.1, 308/187.1
[51] Int. Cl. .................................... F16c 33/72
[58] Field of Search ...... 308/36.1, 72, 187.1, 187.2; 277/94, 95, 169

[56] References Cited
UNITED STATES PATENTS

| 3,243,212 | 3/1966 | May | 308/72 |
| 3,314,735 | 4/1967 | Kocian | 308/187.2 |
| 3,396,977 | 8/1968 | Iguchi | 308/187.2 |
| 3,506,315 | 4/1970 | Young, Jr. | 308/72 |
| 3,584,924 | 6/1971 | O'Neill | 308/187.2 |
| 3,588,201 | 6/1971 | Schmidt | 308/36.1 |

FOREIGN PATENTS OR APPLICATIONS

| 867,005 | 5/1961 | Great Britain | 308/187.2 |
| 392,178 | 9/1965 | Switzerland | 277/169 |
| 1,214,111 | 12/1970 | Great Britain | 308/72 |
| 1,169,046 | 10/1969 | Great Britain | 308/72 |
| 1,223,901 | 6/1960 | France | 277/94 |

*Primary Examiner*—Charles J. Myhre
*Assistant Examiner*—R. H. Lazarus
*Attorney, Agent, or Firm*—Frank S. Troidl

[57] ABSTRACT

A bearing is disclosed comprising two relatively movable parts with one of them having an arcuate outer surface. A seal of special construction is used to entrap lubricant and keep out water and dirt. The seal has three sealing edges. Each of the three sealing edges contacts the movable member having the arcuate outer surface, providing two voids to entrap lubricant which acts to lubricate the sealing edges and provides additional sealing.

2 Claims, 3 Drawing Figures

PATENTED NOV 19 1974　　　3,848,938

BEARING AND BEARING SEAL

This invention relates to bearings and bearing seals. More particularly, this invention is a new and improved bearing including a novel bearing seal of a particular construction.

This new and improved seal is particularly adapted for use with a ball and socket bearing. Those skilled in the art are continuously developing new and improved ball and socket bearing seals. Examples of such seals are shown in U.S. Pat. No. 2,872,219, granted Feb. 3, 1959, to L. D. Cobb; U.S. Pat. No. 2,755,113, granted July 17, 1956, to R. E. Baumheckel; and U.S. Pat. No. 3,588,201, granted June 28, 1971, to Heinrich K. Schmidt. Our new bearing and bearing seal is a new and improved construction which provides better sealing than can be obtained with other seals.

Briefly described, our new seal is particularly designed for use with two relatively movable parts with at least one of the parts having an arcuate surface. The seal is made of an elastomer so as to be flexible. The seal in the relaxed position includes an innermost contact point, a second contact point axially and radially spaced from the innermost contact point, and an outermost contact point axially and radially spaced from the other two contact points.

The new ball and socket bearing includes a socket having at each end an annular groove directed toward the ball. The elastically deformable seal is snapped into the space between the seal-receiving recess in the socket and the ball. The three contact points on the inside of the elastically deformable seal sealingly contact the arcuate outer surface of the ball, thus providing two spaces between the inside of the sealing ring and the outside of the ball.

The invention, as well as its many advantages, may be further understood by reference to the following detailed description and drawings in which.

Figure 1:
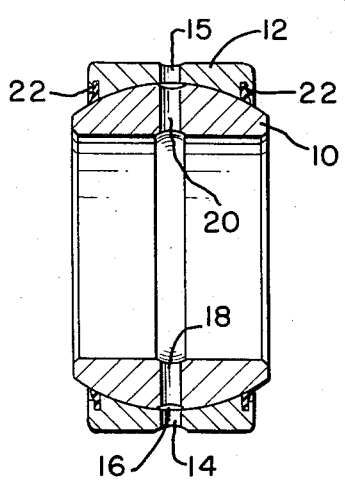
FIG. 1 is a side elevational view, in section, showing a ball and socket bearing.

Referring to FIG. 1, there is shown a ball 10 and a socket 12. The outer surface of the ball is spherical and complements the inner surface of the socket. The bearing is lubricated by the application of a lubricant through lubricant passageways 14 and 15 in the socket, annular groove 16 in the ball, and lubricant passageways 18 and 20 extending radially through the ball. An elastically deformable snap sealing ring 22 is snapped into position at each end of the socket to seal in the lubricant and keep out dirt, water, and other contaminants.

Figure 2:
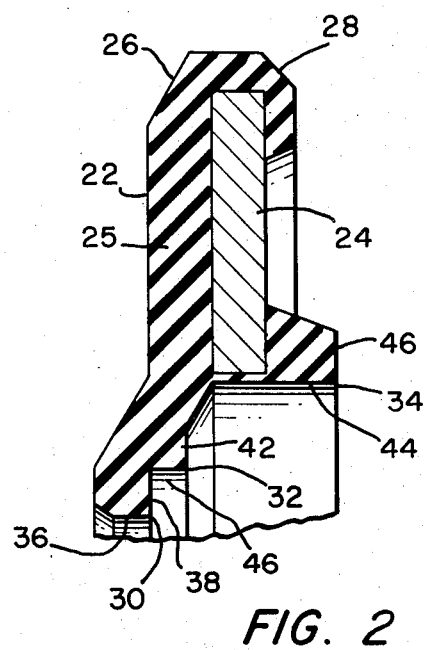
FIG. 2 is a sectional elevational view, on an enlarged scale, of our new bearing seal in the relaxed position.

Referring to FIG. 2, each sealing ring 22 comprises an annular metal washer 24 embedded in the elastically deformable member 25. The front outer edge of the elastically deformable member is beveled at 26, and the back outer edge is beveled at 28 to facilitate the insertion of the seal into the recess provided in the socket 12 of FIG. 1.

The inside of the seal is provided with an innermost contact point 30, a second contact point 32, and an outermost contact point 34. Contact point 32 is axially and radially spaced from contact point 30. Outermost contact point 34 is axially and radially spaced from each of the contact points 30 and 32. In the relaxed position, contact points 30, 32, and 34 are formed by axial edge 36 and radial edge 38, axial edge 40 and radial edge 42, and axial edge 44 and radial edge 46, respectively. Axial edge 44 and radial edge 46 are edges of a cantilevered axially extending lip.

Figure 3:
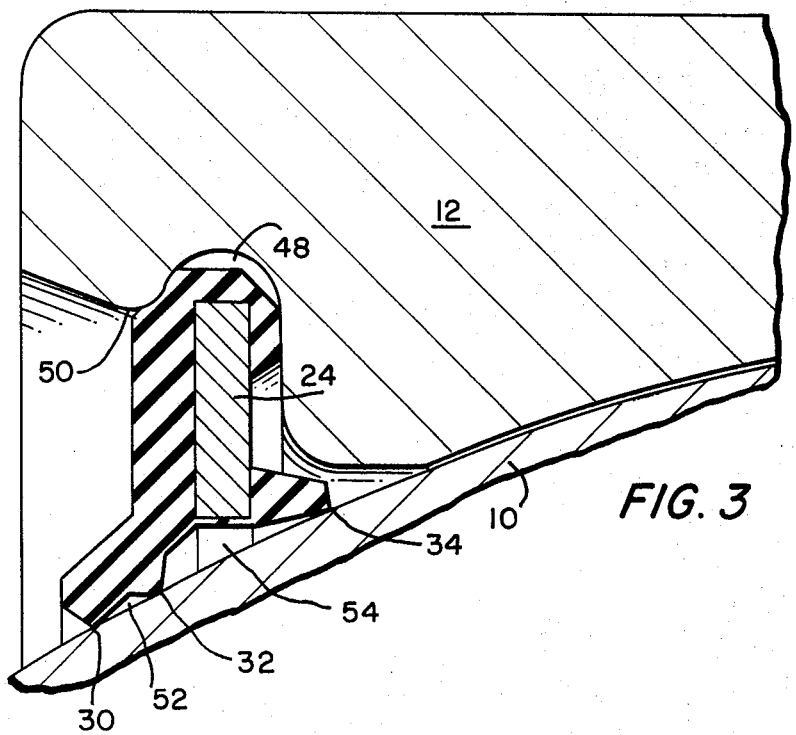
FIG. 3 is a sectional elevational view of our new ball and socket bearing with the new seal snapped in position between the ball and the socket.

Referring to FIG. 3, it can be seen that the socket 12 is provided with an annular recess 48 into which the seal is snapped into position to seal the space between the socket and the ball 10. The metal insert 24 extends radially into the recess. In other words, the inside diameter of annular shoulder 50 is less than the outside diameter of the metal insert.

As can be clearly seen from FIG. 3, the seal is elastically deflected from its relaxed position after it is inserted between the ball 10 and the socket 12. The three axially spaced contact points 30, 32, and 34 are each in sealing contact with the spherical surface of the ball, providing two spaces 52 and 54. The spaces 52 and 54 entrap lubrication which acts to lubricate the sealing edges and provides additional sealing.

We claim:

1. In a sealed, self-aligning bearing, a ball having an outer surface which is a portion of a sphere, a socket having a inner surface cooperating with the spherical outer surface portion of the ball, the socket having at each end an annular groove directed toward the ball forming a seal-receiving recess, and an elastically deformable integral snap-sealing ring filling the space between each seal-receiving recess and the ball, and adapted to enter and lock itself in said space by elastic deflection, each sealing ring having three separate axially-spaced points, each in contact with the spherical outer surface of the ball, thereby providing two spaces between the inside of the sealing ring and the outside of the spherical ball, the outermost point being a surface of a elastically deflected cantilevered axially extending lip.

2. A sealed self-aligning bearing in accordance with Claim 1 wherein the said three separate axially spaced points of said elastically deformable integral snap-sealing ring, in relaxed position, comprises: an innermost contact point formed by the intersection of an axial edge and a radial edge of the sealing ring; a second contact point formed by the intersection of an axial and radial edge of the sealing ring, said second contact point being axially and radially spaced from the first contact point; and a third contact point formed by the intersection of an axial edge and radial edge of the sealing ring, said third contact point being axially and radially spaced from the other two contact points.

* * * * *